(12) United States Patent
Myren et al.

(10) Patent No.: US 9,417,729 B2
(45) Date of Patent: Aug. 16, 2016

(54) CHARGE COMPENSATION DURING TOUCH SENSING

(71) Applicant: Atmel Corporation, San Jose, CA (US)

(72) Inventors: Steinar Myren, Vikhammer (NO);
Fredrik Larsen, Trondheim (NO);
Trond J. Pedersen, Trondheim (NO)

(73) Assignee: Atmel Corporation, San Jose, CA (US)

( * ) Notice: Subject to any disclaimer, the term of this patent is extended or adjusted under 35 U.S.C. 154(b) by 50 days.

(21) Appl. No.: 14/299,716

(22) Filed: Jun. 9, 2014

(65) Prior Publication Data

US 2015/0355775 A1    Dec. 10, 2015

(51) Int. Cl.
*G06F 3/044* (2006.01)
*G06F 3/041* (2006.01)

(52) U.S. Cl.
CPC .............. *G06F 3/0416* (2013.01); *G06F 3/044* (2013.01); *G06F 3/0418* (2013.01); *G06F 2203/04108* (2013.01)

(58) Field of Classification Search
None
See application file for complete search history.

(56) References Cited

U.S. PATENT DOCUMENTS

| | | | |
|---|---|---|---|
| 7,663,607 B2 | 2/2010 | Hotelling | |
| 7,863,909 B2 * | 1/2011 | Keith | H03K 17/962 324/663 |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 * | 11/2011 | Hotelling | G06F 3/044 178/18.01 |
| 8,179,381 B2 | 5/2012 | Frey | |
| 8,217,902 B2 | 7/2012 | Chang | |
| 8,363,031 B2 * | 1/2013 | Geaghan | G06F 3/044 178/18.06 |
| 8,395,599 B2 * | 3/2013 | Souchkov | G06F 3/044 345/174 |
| 8,542,215 B2 * | 9/2013 | Hanauer | G06F 3/0416 345/173 |
| 8,723,824 B2 | 5/2014 | Myers | |
| 8,723,825 B2 * | 5/2014 | Wright | G06F 3/0416 345/156 |
| 8,847,612 B2 * | 9/2014 | Jonsson | G06F 3/044 324/686 |
| 2005/0162408 A1 * | 7/2005 | Martchovsky | G06F 3/044 345/173 |
| 2005/0218913 A1 * | 10/2005 | Inaba | G01D 5/24 324/678 |
| 2006/0022959 A1 * | 2/2006 | Geaghan | G06F 3/0416 345/173 |
| 2008/0309635 A1 | 12/2008 | Matsuo | |
| 2009/0224776 A1 * | 9/2009 | Keith | H03K 17/962 324/686 |
| 2009/0315854 A1 | 12/2009 | Matsuo | |

(Continued)

FOREIGN PATENT DOCUMENTS

WO    WO 2012/129247 A2    9/2012

OTHER PUBLICATIONS

U.S. Appl. No. 61/454,936, filed Mar. 21, 2011, Myers.

(Continued)

*Primary Examiner* — Dismery Mercedes
(74) *Attorney, Agent, or Firm* — Baker Botts L.L.P.

(57) ABSTRACT

An apparatus of one embodiment includes a sensor and a controller. The sensor has first and second electrodes separated by an insulator. The controller includes measurement circuitry, a processor, and a memory comprising logic. The logic is operable to disconnect the second electrode from the measurement circuitry, induce a current on the second electrode by applying voltage to the first electrode, apply charge to the second electrode, connect the second electrode to the measurement circuitry after applying the charge to the second electrode, and determine a capacitance value associated with the second electrode.

26 Claims, 4 Drawing Sheets

(56) References Cited

U.S. PATENT DOCUMENTS

| | | | | |
|---|---|---|---|---|
| 2010/0073323 | A1* | 3/2010 | Geaghan | G06F 3/044 345/174 |
| 2011/0025629 | A1* | 2/2011 | Grivna | G06F 3/0416 345/173 |
| 2011/0048813 | A1* | 3/2011 | Yilmaz | G06F 3/044 178/18.06 |
| 2012/0113047 | A1* | 5/2012 | Hanauer | G06F 3/0416 345/174 |
| 2012/0242588 | A1 | 9/2012 | Myers | |
| 2012/0242592 | A1 | 9/2012 | Rothkopf | |
| 2012/0243151 | A1 | 9/2012 | Lynch | |
| 2012/0243719 | A1 | 9/2012 | Franklin | |
| 2013/0009905 | A1* | 1/2013 | Castillo | G06F 3/044 345/174 |
| 2013/0076612 | A1 | 3/2013 | Myers | |
| 2013/0082763 | A1* | 4/2013 | Inada | G01L 1/146 327/517 |
| 2013/0257786 | A1* | 10/2013 | Brown | G06F 3/044 345/174 |
| 2013/0278277 | A1* | 10/2013 | Trattler | H03K 17/955 324/679 |
| 2013/0278538 | A1* | 10/2013 | Brunet | G06F 3/044 345/174 |
| 2014/0021966 | A1* | 1/2014 | Shahrokhi | G01R 27/2605 324/679 |
| 2014/0022207 | A1* | 1/2014 | Shimizu | G06F 3/044 345/174 |
| 2014/0368464 | A1* | 12/2014 | Singnurkar | G06F 3/0418 345/174 |

OTHER PUBLICATIONS

U.S. Appl. No. 61/454,950, filed Mar. 21, 2011, Lynch.
U.S. Appl. No. 61/454,894, filed Mar. 21, 2011, Rothkopf.

* cited by examiner

CHARGE COMPENSATION DURING TOUCH SENSING

TECHNICAL FIELD

This disclosure relates generally to touch sensor technology; and more particularly to charge compensation during touch sensing.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), Smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, in particular embodiments. When an object touches or comes within proximity of the surface of the capacitive touch screen, a change in capacitance may occur within the touch screen at the location of the touch or proximity. A controller may process the change in capacitance to determine its position on the touch screen.

BRIEF DESCRIPTION OF THE DRAWINGS

For purposes of simplified illustration, the drawings included in the figures are not drawn to scale.

DESCRIPTION OF EXAMPLE EMBODIMENTS

Certain touch sensors operate by detecting a change in capacitance caused by the proximity of an external object (such as, for example, a hand or a stylus). This change in capacitance, or "delta capacitance," is detected by measurement circuitry to determine the presence or location of the object. However, because the total capacitance of a sensed electrode may be significantly larger than the delta capacitance, the baseline signal may be significantly larger than the change in the baseline signal caused by the proximity of the object. As used herein, a "baseline" signal or measurement refers to a value measured by measurement circuitry when the touch sensor is not being substantially affected by a nearby external object such as, for example, a hand or a stylus. Similarly, "baseline operation" refers to operation of a touch sensor when such external objects are not sufficiently close to the touch sensor to substantially affect its measurements. As used herein, a "delta" signal or measurement refers to a change relative to the baseline signal that is caused by the proximity of such an object. The touch sensor's ability to measure the relevant change in capacitance may be hindered because the delta capacitance is measured relative to a significantly larger baseline signal, which may result in suboptimal touch sensor resolution, accuracy, or linearity. For example, with measurement circuitry that has a limited measurement range, the gain of the measurement circuitry may be limited to prevent the total signal (including the relatively large baseline signal) from exceeding the measurement threshold (i.e. "railing" the system). The large baseline charge present on the measured electrodes may therefore reduce the ability of such touch sensors to precisely measure small changes in capacitance.

Some embodiments of the present disclosure may provide improved touch sensor resolution, accuracy, or linearity by compensating for charge on a sensed electrode to reduce the baseline signal relative to the delta signal. In some embodiments, improved touch sensing is achieved by cancelling a predetermined amount of charge from the electrode before connecting the electrode to the measurement circuitry. For example, some embodiments disconnect a sense electrode from the measurement circuitry and then induce charge on the sense line via a capacitor (referred to herein as a "charge compensation capacitor"). The voltage applied to this charge compensation capacitor may be calibrated such that its effect on the sense electrode compensates for the current otherwise induced during baseline operation. Calibration may also be accomplished by changing the size of the charge compensation capacitor. As another example, a current source providing a constant current over a period of time could be used as an alternative to the use of a capacitor. Using these and other embodiments, the value measured by the measurement circuitry may be reduced, or brought approximately to zero, during baseline operation. Thus, when an object is near the touch sensor, the small delta capacitance results in a more significant change, percentage-wise, from the baseline measurement. Because the measurement circuitry does not need to allow for relatively large baseline measurements compared to the relatively small delta, the gain may be increased to amplify the delta signal, which may improve touch sensor resolution, accuracy, or linearity. Furthermore, some embodiments perform charge compensation while the sense electrode is disconnected from the measurement system, which may allow the voltage on the sense electrode to settle before it is measured. Disconnecting the sense electrode from the measurement system in this manner may therefore allow the measurement system to avoid actively measuring the overshooting or undershooting of the equilibrium voltage that may occur during this settling process. Since the measurement system may not need to avoid railing during these swings in voltage, due to the disconnection of the sense electrode, the gain may be further increased, which may improve the accuracy, resolution, or linearity of touch or proximity measurements.

Figure 1:
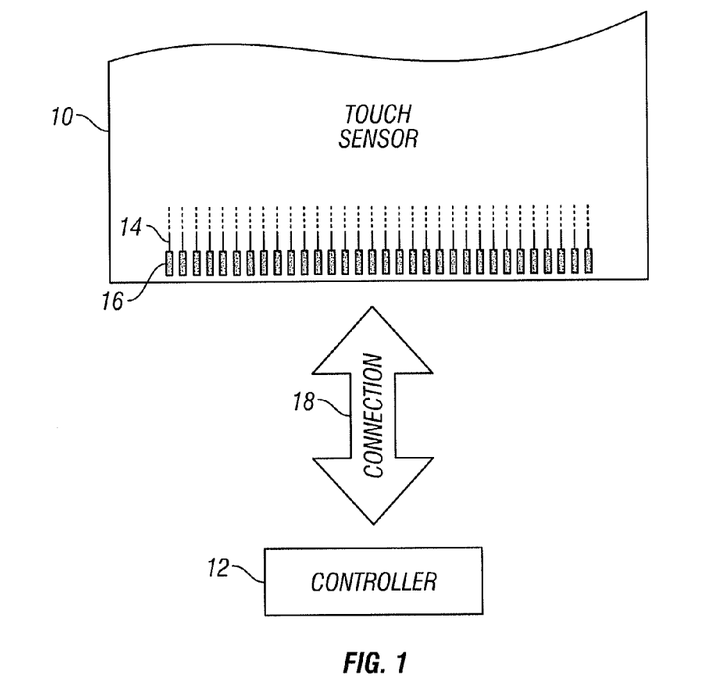
FIG. 1 illustrates an example touch sensor with an example controller that may be used in certain embodiments of the present disclosure.

FIG. 1 illustrates an example touch sensor 10 with an example controller 12, according to certain embodiments of the present disclosure. Touch sensor 10 and controller 12 may detect the presence and location of a touch or the proximity of an object within a touch-sensitive area of touch sensor 10.

Herein, reference to a touch sensor may encompass both the touch sensor and its controller, where appropriate. Similarly, reference to a controller may encompass both the controller and its touch sensor, where appropriate. Touch sensor 10 may include one or more touch-sensitive areas. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on. Alternatively, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates electrodes made of any suitable material.

As used herein, a capacitive node refers to a portion of touch sensor 10 that is configured to provide a distinct capacitive measurement. In various embodiments, capacitive nodes may have different sizes, shapes, and/or configurations. Furthermore, in some embodiments, the size, shape, and other aspects of a capacitive node may be determined by the configuration of controller 12 and may be changed dynamically during the operation of device 20. For example, in some embodiments, multiple electrodes or tracks 14 may be galvanically connected and sensed together, resulting in a capacitive node spanning multiple electrodes.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and controller 12 may measure the change in capacitance. A touch may refer to an external object touching a capacitive node directly or touching a cover or substrate adjacent to the capacitive node. By measuring changes in capacitance throughout the array, controller 12 may determine the position of the touch or proximity within the touch-sensitive area(s) of touch sensor 10.

In a self-capacitance implementation, touch sensor 10 may include an array of electrodes of a single type that may each form a capacitive node. In such embodiments, a capacitive node may correspond to a single electrode, or a set of multiple connected electrodes, rather than an intersection of electrodes. When an object touches or comes within proximity of the capacitive node, a change in self-capacitance may occur at the capacitive node and controller 12 may measure the change in capacitance, for example, as a change in the amount of charge needed to raise the voltage at the capacitive node by a pre-determined amount. As with a mutual-capacitance implementation, by measuring changes in capacitance throughout the array, controller 12 may determine the position of the touch or proximity within the touch-sensitive area(s) of touch sensor 10. This disclosure contemplates any suitable form of capacitive touch sensing.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. Furthermore, in embodiments using self-capacitance touch sensing, an electrode that is driven may then be sensed by measurement circuitry of controller 12. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. In some embodiments, this dielectric may be air. Moreover, this disclosure contemplates electrodes disposed on any suitable number of substrates. Example embodiments of electrodes are discussed below with respect to electrodes 24 of FIG. 2.

As described above, a change in capacitance at a capacitive node of touch sensor 10 may indicate a touch or proximity input at the position of the capacitive node. Controller 12 may detect and process the change in capacitance to determine the presence and location of the touch or proximity input. Controller 12 may then communicate information about the touch or proximity input to one or more other components (such one or more central processing units (CPUs)) of a device that includes touch sensor 10 and controller 12, which may respond to the touch or proximity input by initiating a function of the device (or an application running on the device). Although this disclosure describes a particular controller having particular functionality with respect to a particular device and a particular touch sensor, this disclosure contemplates any suitable controller having any suitable functionality with respect to any suitable device and any suitable touch sensor.

Controller 12 may be one or more integrated circuits (ICs), such as for example general-purpose microprocessors, microcontrollers, programmable logic devices or arrays, application-specific ICs (ASICs). In particular embodiments, controller 12 comprises analog circuitry, digital logic, and digital non-volatile memory. In particular embodiments, controller 12 is disposed on a flexible printed circuit (FPC) bonded to the substrate of touch sensor 10, as described below. The FPC may be active or passive, where appropriate. In particular embodiments, multiple controllers 12 are disposed on the FPC. Controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular controller having a particular implementation with particular components, this disclosure contemplates any suitable controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to controller 12. Tracks 14 may extend into or around (e.g. at the edges of) the touch-sensitive area(s) of touch sensor 10. Particular tracks 14 may provide drive connections for coupling controller 12 to drive electrodes of touch sensor 10, through which the drive unit of controller 12 may supply drive signals to the drive electrodes. Other tracks 14 may provide sense connections for coupling controller 12 to sense electrodes of touch sensor 10, through which the sense unit of controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, controller 12 may be on an FPC. Connection pads 16 may be made of the same material as tracks 14 and may be bonded to the FPC using an anisotropic conductive film (ACF). Connection 18 may include conductive lines on the FPC coupling controller 12 to connection pads 16, in turn coupling controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between controller 12 and touch sensor 10.

Certain embodiments of touch sensor 10 and controller 12 may measure capacitance or a change in capacitance using any suitable method. For example, voltage may be applied to one or more electrodes via one or more tracks 14 by opening or closing one or more switches. Such switches may connect one or more electrodes to other portions of touch sensor 10 or controller 12 such as, for example, a voltage source (e.g. a voltage supply rail), a current source, or any other suitable component. Such methods may cause charge to be transferred to or from one or more portions of one or more electrodes via one or more tracks 14. In self-capacitance embodiments, the charged electrodes may be sensed to measure a value associated with the capacitance of the one or more electrodes. The presence of an object such as a finger or a stylus may change the amount of charge induced on the sensed electrode, and this change may be measured by controller 12 to determine the position of the object. The position may be a distance between the object and touch sensor 10 (e.g., a hover detection) and/or a projection of a portion of the object onto touch sensor 10 (e.g., a point on touch sensor 10 where the object is touching or hovering). Thus, in an embodiment where the surface of touch sensor 10 lies in the X-Y plane and the Z axis is orthogonal to the X-Y plane, the position may correspond to the X coordinates of the object, Y coordinates, Z coordinates, X-Y coordinates, X-Z coordinates, Y-Z coordinates, X-Y-Z coordinates, any reference position correlating with X, Y, or Z coordinates, or any other suitable position information. In certain embodiments, the same measured values may be used to determine both of the distance between the object and touch sensor 10 and the projection of a portion of the object onto touch sensor 10. Controller 12 may also factor in additional measurements to determine this position. For example, multiple electrodes may be sensed synchronously or in close succession, and the position of the object may be determined based on a calculation factoring in each of these measurements. Furthermore, controller 12 may utilize additional calculations to facilitate determination of the position. For example, certain embodiments may use weighted averages, linear approximation, any other suitable calculation, or any suitable combination thereof to facilitate the determination of the object's position.

Figure 2:
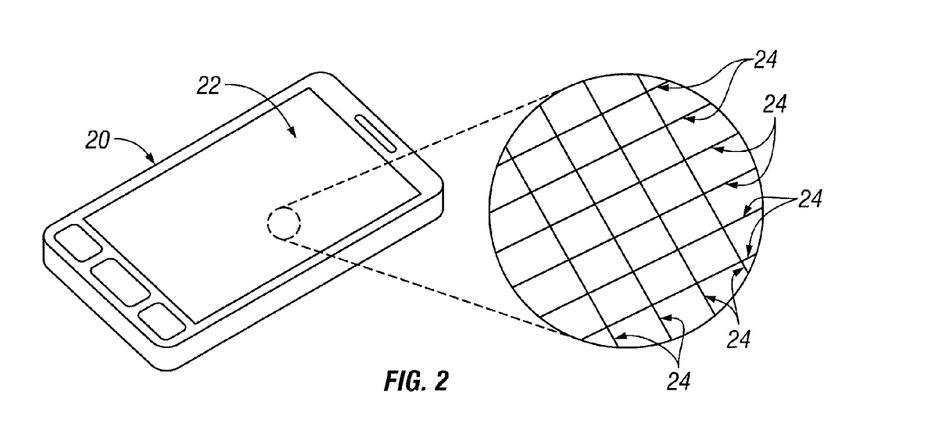
FIG. 2 illustrates an example device and example electrodes that may be used in certain embodiments of the present disclosure.

Certain embodiments may perform measurements using any suitable number of steps that facilitate capacitance measurements. For example, some embodiments may perform any suitable combination of pre-charging one or more electrodes, charging one or more electrodes, transferring charge between two or more electrodes, discharging one or more electrodes, and/or any other suitable step. In some embodiments, a transfer of charge may be measured directly or indirectly. For example, certain embodiments may utilize voltage measurements, current measurements, timing measurements, any other suitable measurement, or any combination thereof to measure capacitance or a change in capacitance at one or more capacitive nodes. Furthermore, certain embodiments may utilize additional circuitry (such as, for example, one or more integrators, amplifiers, capacitors, switches, analog-to-digital converters, and/or any other suitable circuitry) to perform and/or enhance such measurements. Certain embodiments may measure a value at a particular point in time, measure a change in a value over time, and/or perform any other suitable processing to facilitate the determination of an object's position relative to touch sensor 10. Measurement circuitry is discussed further below with respect to measurement circuitry FIG. 2 illustrates an example device and example electrodes that may be used in certain embodiments of the present disclosure. In the illustrated embodiment, device 20 includes display 22 and electrodes 24.

Device 20 may be any device that is capable of performing touch or proximity sensing. In various embodiments, device 20 may be a smartphone, tablet computer, laptop computer, or any suitable device utilizing a touch sensor 10. Device 20 may include a display 22 that may be overlaid by or otherwise positioned proximate to touch sensor 10. Display 22 and touch sensor 10 may be substantially planar, curved, or have any other suitable configuration.

Electrodes 24 may include any structure, configuration, and/or function of the electrodes described above with respect to FIG. 1. While the illustrated embodiment depicts certain electrodes 24 running across display 22 perpendicular to certain other electrodes 24, other embodiments may use any suitable configuration of electrodes 24. For example, certain embodiments of electrodes 24 may utilize different shapes, patterns, and/or configurations. Furthermore, certain embodiments may use different types, shapes, or configurations of electrodes 24 within the same touch sensor 10. For example, in some embodiments, electrodes 24 may be electrode "lines" that may be parallel, perpendicular or have any suitable orientation relative to other electrodes 24. In alternative embodiments, which may include certain self-capacitance embodiments, electrodes 24 may be non-linear electrodes, rather than intersecting "lines," such that each column and/or row of touch sensor 10 may include multiple electrodes 24, each of which is separately connected or connectable to controller 12. In such embodiments, electrodes 24 may have any suitable shape or pattern (e.g., square, round, triangular, hexagonal, or any other suitable shape or pattern). Furthermore, each electrode 24 may have any suitable micro-features not illustrated in FIG. 2. For example, certain electrodes 24 may be electrode lines, each line formed from a conductive mesh or other conductive microstructures. Electrodes 24 may be constructed from conductive subcomponents having any suitable shape, size, or configuration. Furthermore, certain electrodes 24 may be galvanically or otherwise connected to associated tracks 14. For example, in some embodiments, electrodes 24 may be connected to respective tracks 14 such that applying voltage to a track 14 applies voltage to the respective electrode 24.

The delta capacitance on one or more electrodes 24 may be measured using any suitable technique. As a particular example, a change in capacitance may be measured as a change in the amount of charge needed to raise the voltage at the capacitive node by a pre-determined amount. As another example, some embodiments measure capacitance by determining an amount of charge needed to bring the voltage of sensed electrode back to a reference voltage, as discussed further below with respect to FIG. 4. By measuring changes in capacitance throughout the array of electrodes, controller 12 may determine the position of the touch or proximity within the touch-sensitive area(s) of touch sensor 10. Furthermore, multiple electrodes 24 or tracks 14 may be galvanically connected to form a cluster that can be sensed as a single capacitive node. Certain embodiments may use self-capacitance sensing, mutual-capacitance sensing, or any suitable combination thereof. For example, some embodiments may alternate or otherwise switch between self-capacitance sensing and mutual capacitance sensing. In such embodiments, self-capacitance sensing may be performed using the same set of electrodes (or a subset or superset thereof) that are used to perform mutual-capacitance sensing, or self and mutual-capacitance sensing may be performed using distinct sets of electrodes.

Figure 3:
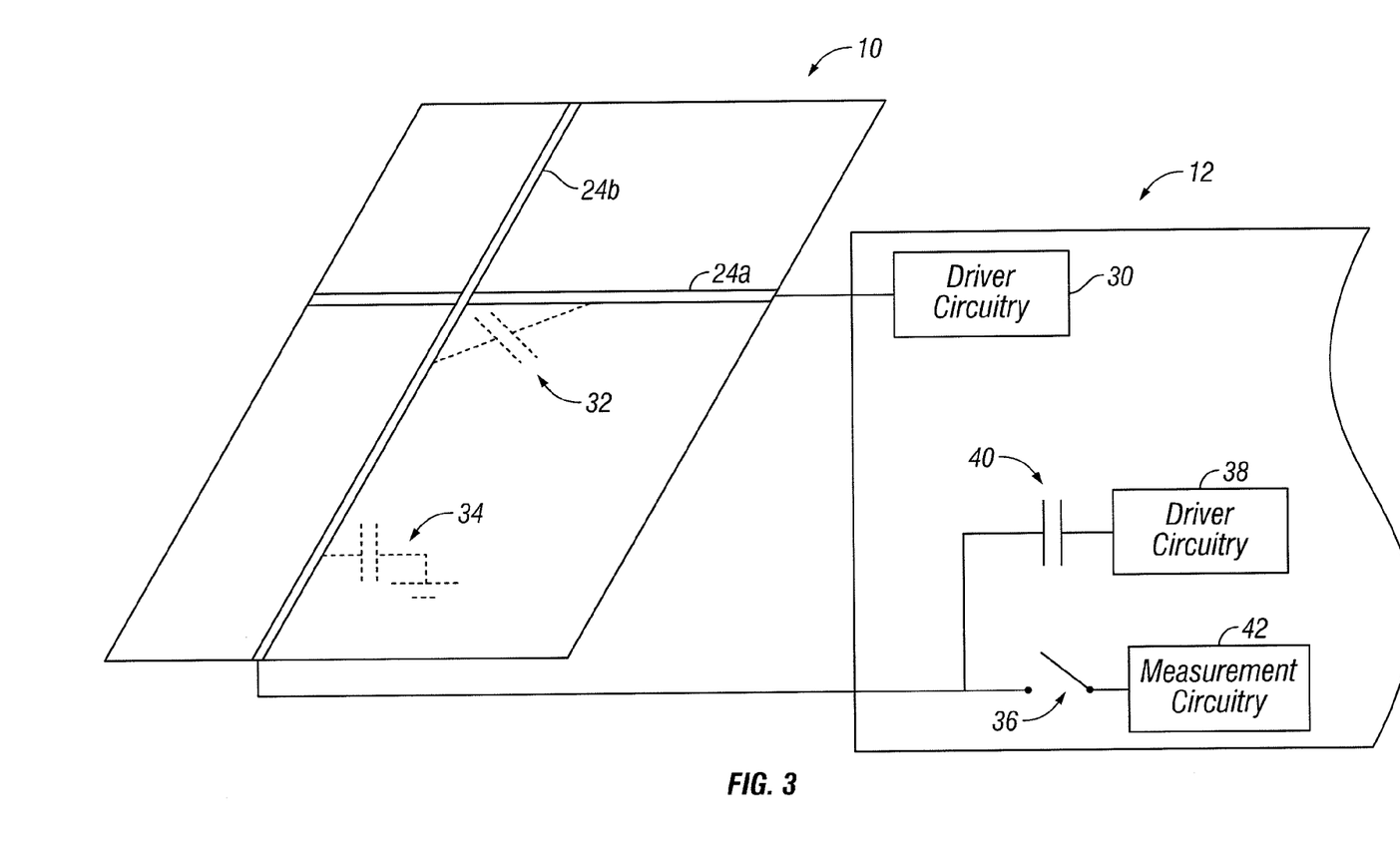
FIG. 3 illustrates components of an example touch sensor and an example controller that may be used in certain embodiments of the present disclosure.

FIG. 3 illustrates components of an example touch sensor and an example controller that may be used in certain embodiments of the present disclosure. In the illustrated embodiment, touch sensor 10, which includes electrodes 24a and 24b, is connected to controller 12, which includes driver circuitry 30, switch 36, driver circuitry 38, capacitor 40, and measurement circuitry 42. While the operation of the embodiment shown in FIG. 3 relates to mutual-capacitance sensing, other embodiments may use analogous charge compensation techniques during self-capacitance sensing or other types of touch sensing.

Electrodes 24a and 24b represent a drive electrode and a sense electrode, respectively. This configuration is provided merely as an example, and electrodes 24a and 24b may operate interchangeably as drive or sense electrodes in some embodiments. For example, electrode 24a may be operated as a drive electrode during a first sensing sequence, and electrode 24b may be operated as a drive electrode during a subsequent sensing sequence. Furthermore, a single drive electrode and a single sense electrode are shown for purposes of simplified illustration. Certain embodiments may have any suitable number of drive or sense electrodes having any suitable configuration.

Driver circuitry 30 may include any suitable components that are capable of applying voltage to one or more components of touch sensor 10. For example, in particular embodiments, driver circuitry 30 includes a pulse generator. Driver circuitry may have any structure, configuration, or function of the drive unit discussed above with respect to FIG. 1. In some embodiments, driver circuitry 30 applies voltage to electrode 24a, which may induce current on electrode 24b via the capacitive coupling (illustrated as capacitance 32) between electrodes 24a and 24b. In some embodiments, driver circuitry 30 may generate a square pulse, while in other embodiments driver circuitry 30 may ramp up the voltage or apply voltage in any other suitable manner. Driver circuitry 30 may apply any suitable voltage to electrode 24a. For example, in some embodiments, the supply voltage (referred to herein as "Vdd") may be 3.3V, though this is not required. Other embodiments may use any suitable supply voltage.

Capacitance 32 represents the capacitive coupling between electrodes 24a and 24b. While illustrated as a capacitor, typically capacitance 32 results from the configuration of electrodes 24a and 24b without utilizing additional capacitive components. In some embodiments, when electrode 24a is pulsed via driver circuitry 30, current is induced on electrode 24b via capacitance 32. During baseline operation, this current corresponds to the baseline signal. The proximity of an external object may affect capacitance 32, thereby changing the amount of current induced on electrode 24b via capacitance 32. Controller 12 may detect this change on one or more electrodes 24 to determine the presence, proximity, or location of one or more touches or hovers.

Capacitance 34 represents the parasitic capacitance of electrode 24b. In some embodiments, this parasitic capacitance results from capacitive coupling between an electrode 24 and the grounding of one or more components of device 20. For example, capacitance 34 may result from an unintentional load caused by display 22. In some embodiments, capacitance 34 may allow electrode 24 to store charge transferred during a touch sensing sequence. For example, as explained in more detail below with respect to FIGS. 4 and 5, electrode 24b may be disconnected from measurement circuitry 42 during a portion of the touch sensing sequence. When electrode 24b is floated or tri-stated in this manner, the charge or voltage present on electrode 24b may be effectively stored via capacitance 34. Subsequent charging of electrode 24b (e.g. by the application of voltage via driver circuitry 30 or driver circuitry 38) may allow this modified amount of charge to settle on or be stored by capacitance 34. Allowing charging sequences to be conducted in this manner may reduce the likelihood that measurement circuitry 42 is railed, or the range of the system exceeded, while the voltage on electrode 24b settles, which may allow the gain of measurement circuitry 42 to be increased to provide improved resolution, accuracy, or linearity during touch sensing.

Switch 36 may be any suitable circuitry operable to connect or disconnect one or more electrodes 24 from measurement circuitry 42. For example, switch 36 may be any appropriate form of mechanical and/or electrical switching device operable to conduct current in the on position and/or form an open circuit in the off position. As a particular example, switch 36 may be any appropriate form of transistor device, including field effect transistors (FETS). In some embodiments, switch 36 may be implemented using metal-oxide-semiconductor FETS (MOSFETS), such as NMOS or PMOS transistors. The gate of switch 36 may be controlled via one or more control signals transmitted from controller 12. Switch 36 may be part of touch sensor 10 or controller 12, and touch sensor 10 or controller 12 may have any suitable number, type, and/or configuration of switches 36. In some embodiments, switch 36 disconnects a sense electrode from controller 12 to "float" the electrode while charge compensation techniques described herein are performed. By disconnecting a sense electrode before the charging compensation process, switch 36 may allow charge compensation on the sense electrode to be performed before measurement circuitry 42 measures voltage, current, or any other capacitance value, which may enable increased gain in measurement circuitry 42. For example, disconnecting measurement circuitry 42 from the sense electrode may allow the current or voltage on electrode 24b to settle before electrode 24b is connected to measurement circuitry 42. By not subjecting measurement circuitry 42 to this settling process (during which voltage or current may change back and forth before adjusting to a relative equilibrium), the gain of the measurement system may be increased without railing the system. Charge compensation techniques are discussed in more detail below.

Driver circuitry 38 may include any suitable components that are capable of generating and/or applying voltage to one or more components of touch sensor 10. Driver circuitry 38 may have any suitable structure, configuration, or function described above with respect to driver circuitry 30. In some embodiments, driver circuitry 38 share one or more components with driver circuitry 30, while in other embodiments, driver circuitry 38 and driver circuitry 30 are distinct components. In some embodiments, driver circuitry 38 applies voltage to capacitor 40 or any suitable component to oppose the current on a sense electrode that would otherwise flow during baseline operation. For example, driver circuitry 38 may include a pulse generator that generates a voltage pulse that affects the charge on the sense electrode (e.g. electrode 24*b*) via capacitor 40. Driver circuitry 38 may generate this pulse before, simultaneously with, or after current is induced on the sense electrode by driver circuitry 30. The operation of driver circuitry 38 is discussed further below with respect to FIGS. 4 and 5.

Capacitor 40 may be any capacitor capable of opposing current that occurs during baseline operation of touch sensor 10. In some embodiments, one side of capacitor 40 is connected to driver circuitry 38, while the other side of capacitor 40 is connected to one or more electrodes 24. Capacitor 40 may be permanently or adjustably connected to these components. In operation, capacitor 40 facilitates charge compensation during the operation of touch sensor 10. For example, voltage may be applied by driver circuitry 38 to electrode 24*b* via capacitor 40 to oppose the current that would otherwise be generated during baseline operation. Applying charge compensation voltage in this manner may reduce the baseline measurement, thereby allowing the gain of the measurement system to be increased without railing the system.

Measurement circuitry 42 may include any component operable to perform electrical measurements from touch sensor 10. Measurement circuitry 42 may include any components and may perform any measurement functionality described above with respect to controller 12 in FIG. 1. For example, measurement circuitry 42 may have any structure, configuration, or function of the sense unit discussed above with respect to FIG. 1. Some embodiments of controller 12 may include multiple distinct channels of measurement circuitry 42. Furthermore, in some embodiments, one or more portions of measurement circuitry 42 may be multiplexed to measure signals from multiple electrodes 24. In some embodiments, measurement circuitry 42 is operable to measure one or more capacitance values associated with an electrode 24. As used herein, a capacitance value refers to any value that directly or indirectly indicates the capacitance or change in capacitance of a capacitive node. For example, a capacitance value may be a voltage, current, charge, time, capacitance, or any other suitable value indicative of the capacitance at a sensed capacitive node. Based on one or more capacitance values measured by measurement circuitry 42, controller 12 may determine the location of one or more touches or hovers, detect the presence or proximity of an external object, or perform any suitable touch or proximity calculations.

In some embodiments, measurement circuitry 42 may include an integrator that is operable to measure the capacitance value over time. Other embodiments may also include an amplifier, such as, for example, an operational amplifier. Such amplifiers may have a gain value that can be increased to improve the accuracy or precision of touch sensing. In some embodiments, the integrator and amplifier may be distinct components, while in other embodiments they be part of the same component. Measurement circuitry 42 may have a measurement limit, wherein exceeding the measurement limit rails the measurement system or has other detrimental effects. Applying charge compensation voltage to oppose or otherwise compensate for charge transfer, that would otherwise occur during baseline operation, may reduce the baseline measurements, thereby allowing the gain of the measurement system to be increased without railing the system. Furthermore, due to the resistivity of components of touch sensor 10, the timing of the application of the charge compensation voltage may result in a certain settling period in which the voltage of electrode 24*b* varies before settling at an equilibrium value (as shown, for example, by sense electrode voltage 50 of FIG. 4). If measurement circuitry 42 were connected to the sense electrode during this period, its gain may need to be adjusted to avoid railing the system during integration of this settling voltage. Disconnecting measurement circuitry 42 from electrode 24*b* or another electrode 24 that is about to be measured may allow the measurement system to avoid measurements during such periods, which may enable greater gain without railing the system.

Figure 4:
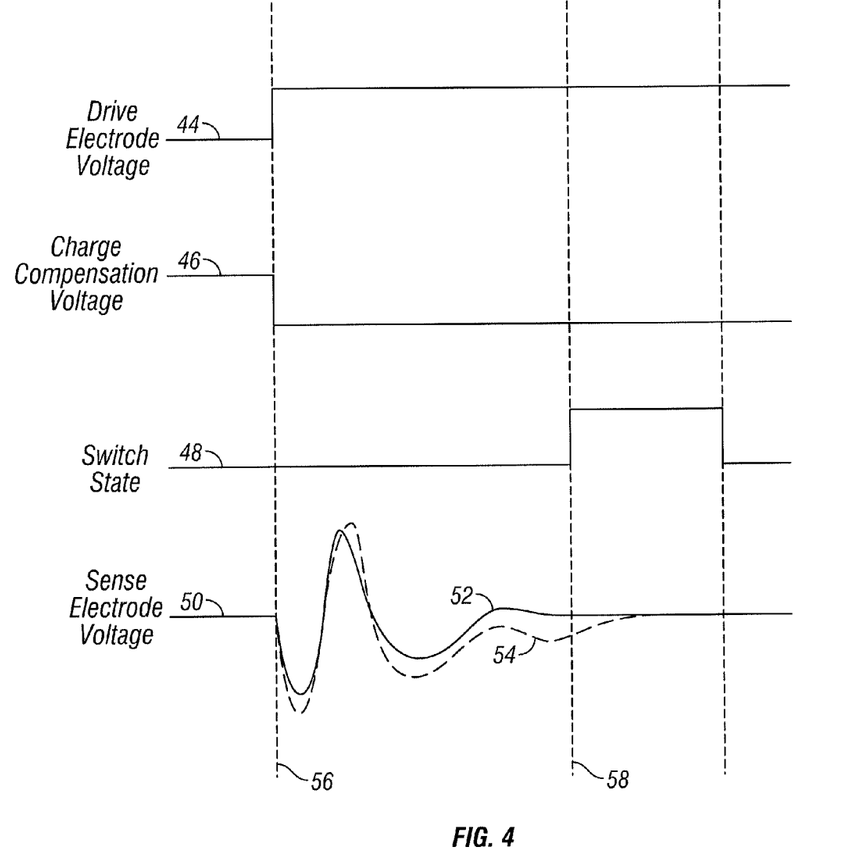
FIG. 4 illustrates example electrical states of components of an example touch sensor during operation in accordance with certain embodiments of the present disclosure.

FIG. 4 illustrates example electrical states over time of components of an example touch sensor during operation in accordance with certain embodiments of the present disclosure. FIG. 4 illustrates drive electrode voltage 44, charge compensation voltage 46, switch state 48, and sense electrode voltage 50. These states are shown progressing over time, with their respective states highlighted at time 56 and time 58. As discussed below, these example states correspond to certain components of FIG. 3. The example illustrated corresponds to an example mutual capacitance configuration, although self-capacitance configurations may also be used.

Drive electrode voltage 44 represents the voltage applied to the drive electrode during an example sequence of operating touch sensor 10. In a particular embodiment, drive electrode voltage 44 corresponds to the voltage applied to electrode 24*a* of FIG. 3. Charge compensation voltage 46 represents the voltage applied to the charge compensation capacitor during an example sequence of operating touch sensor 10. In a particular embodiment, charge compensation voltage 46 corresponds to the voltage applied to capacitor 40 of FIG. 3. Switch state 48 represents the state of a switch between the sense electrode and the measurement circuitry of controller 12 during an example sequence of operating touch sensor 10. In a particular embodiment, switch state 48 corresponds to the state of switch 36 of FIG. 3. Sense electrode voltage 50 represents the voltage measured by the measurement circuitry of controller 12 during an example sequence of operating touch sensor 10. In a particular embodiment, sense electrode voltage 50 corresponds to the voltage detected by measurement circuitry 42 of FIG. 3. Sense electrode voltage 50 is shown in two different states. Baseline signal 52 represents sense electrode voltage during baseline operation (i.e. when the sensed external object is not sufficiently close to touch sensor 10 to substantially affect capacitive measurements). Delta signal 54 represents sense electrode voltage during an example delta operation (i.e. when the sensed external object is sufficiently close to touch sensor 10 to substantially affect capacitive measurements).

At time 56, voltage is applied to the drive electrode (e.g. electrode 24*a* of FIG. 3), as shown in drive electrode voltage 44. This voltage may be applied by driver circuitry 30 or any other suitable component. In some embodiments, voltage is also applied to the sense electrode at time 56, as shown, for example, in charge compensation voltage 46. This voltage may be applied by driver circuitry 38 or any other suitable component. Other embodiments may apply the charge compensation voltage before or after the application of voltage to the drive electrode. In some embodiments, drive electrode voltage 44 may change from a ground value (e.g., 0V or any other suitable voltage) to a supply voltage amount (e.g., 3.3V or any other suitable voltage), while the charge compensation voltage 46 may change from the supply voltage to the ground value, though this is not required. In particular embodiments, the sense electrode is pre-charged to a reference voltage, such as Vdd/2. In other embodiments, the reference voltage could be set to another suitable voltage between ground and Vdd, or even to a voltage outside of this range. At time 56, drive electrode voltage 44 and charge compensation voltage 46 may be on opposite sides of the reference voltage. As a particular example, where the reference voltage is Vdd/2, drive electrode voltage 44 may change from 0 to Vdd at time 56 and charge compensation voltage 46 may change from Vdd to 0 at time 56. Other embodiments may use any suitable voltages. As another example, where the reference voltage is 0, drive electrode voltage 44 may be set at Vdd while charge compensation voltage 46 is set at −Vdd, such that the charge is equal but opposite. Driving charge compensation voltage 46 in the opposite direction as drive electrode voltage 44 may allow charge compensation voltage 46 to substantially cancel the signal that would otherwise be measured during baseline operation.

After charge is applied to the drive and sense electrodes, sense electrode voltage 50 may undergo a settling period before arriving at an equilibrium value at time 58. As illustrated in FIG. 4, sense electrode voltage 50 changes direction several times between times 56 and 58. As shown by switch state 48, measurement circuitry 42 may be disconnected from the sense electrode during this period. In embodiments where measurement system 42 is disconnected in this manner, its gain may not need to be adjusted to avoid railing the system during the upward and downward swings of sense electrode voltage 50 between times 56 and 58. The connection of measurement circuitry 42 to the sense electrode may be dynamically triggered based on a determination that the voltage has substantially settled, triggered after a predetermined amount of time, or triggered in any other suitable manner. In embodiments where this timing is predetermined, the time interval between time 56 and 58 may be hard-coded into controller 12, dynamically determined by a calibration procedure prior to the sensing sequence, or determined by any other suitable techniques. In alternative embodiments, measurement circuitry may be connected while the voltage is settling.

At time 58, switch 36 is closed (as shown by switch state 48), connecting measurement circuitry 42 to the sense electrode to facilitate the measurement of a capacitance value. In some embodiments, the capacitance value is measured relative to a reference value. For example, in some embodiments, the sense electrode may pre-charged to a reference level prior to the disconnection of the sense electrode from measurement circuitry 42, and, upon reconnection, measurement circuitry 42 measures the voltage relative to the reference level. In particular embodiments, at time 58, measurement circuitry 42 drives sense electrode voltage 50 back to the reference level and measures (directly or indirectly) the amount of charge needed to bring the voltage back to this reference level. In some embodiments, the reference voltage may be between 0 and the supply voltage. In particular embodiments, the reference voltage is Vdd/2. Various embodiments may measure the capacitance value using any suitable technique.

As shown in FIG. 4, baseline signal 52 settles approximately to the reference voltage as a result of the charge compensation, while delta signal 54 settles to a value that differs from the reference voltage by an amount approximately equal to the change caused by the proximity of the external object. Thus, in some embodiments, the measured signal during baseline operation is approximately zero, and the measured signal during delta operation is primarily due to the effects of the external objet. Charge compensation techniques may therefore allow the gain of the measurement system to be increased because the total measured value (e.g., baseline signal+delta) is reduced. Furthermore, in embodiments where the connection of the measurement circuitry is delayed to allow the sense electrode voltage to settle, the gain may be further increased because the measurement system does not have to tolerate the overshooting and undershooting as sense electrode voltage 50 settles. Charge compensation techniques may therefore enable more sensitive measurements, which may improve the resolution, accuracy, or linearity of touch or proximity detection.

Figure 5:
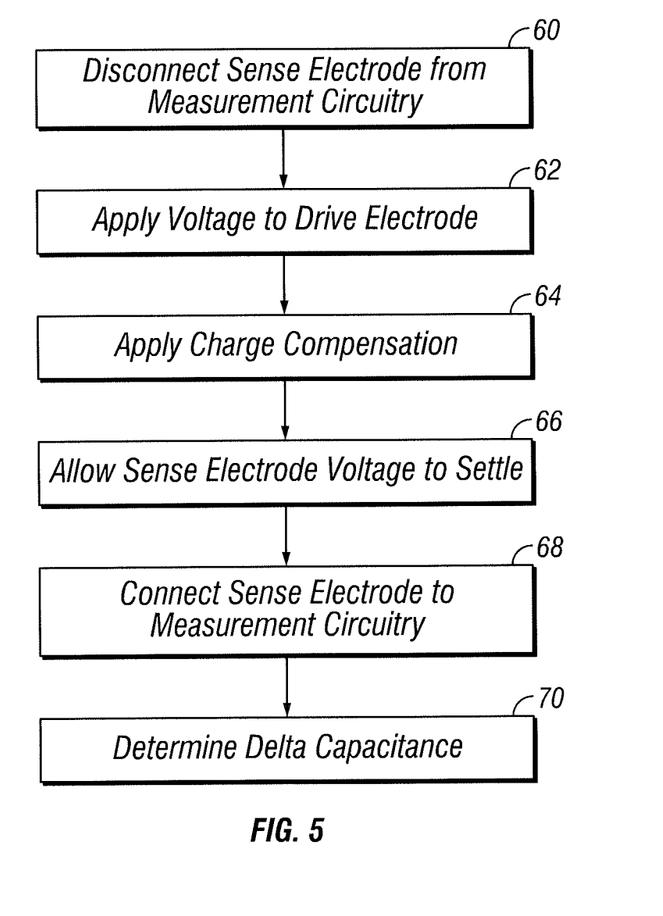
FIG. 5 illustrates an example method of using charge compensation during touch sensing in accordance with certain embodiments of the present disclosure.

FIG. 5 illustrates an example method of using charge compensation during touch sensing in accordance with certain embodiments of the present disclosure. This sequence is provided merely as an example, and other embodiments may use all, some, or none of these steps. Furthermore, certain embodiments may use other steps in addition to or in place of the steps described below.

At step 60, the sense electrode is disconnected from the measurement system. For example, in particular embodiments, electrode 24b is disconnected from measurement circuitry 42 by opening switch 36. In some embodiments, the sense electrode may be pre-charged to a reference level. For example, the sense electrode may be pre-charged to a voltage between 0 and Vdd (such as, for example, Vdd/2) or any other suitable voltage. Pre-charging in this manner may provide a virtual ground that enables the detection of delta effects in both directions. Following the disconnection of the sense electrode from the measurement system, the sense electrode may substantially hold its charge, which may be stored on the parasitic capacitance of the electrode (e.g., capacitance 34). Disconnecting the sense electrode from the measurement system in this manner may allow charge compensation techniques to be performed without railing the measurement system.

At step 62 voltage is applied to a drive electrode. In some embodiments, voltage is applied to the drive electrode by connecting it to a voltage source (e.g. a voltage supply rail), a current source, or any other suitable component. For example, in particular embodiments, voltage is applied to electrode 24a via a pulse generator, which may cause charge to be transferred to or from electrode 24a. Voltage may be applied for a fixed amount of time or a variable amount of time. In some embodiments, a predetermined amount of charge may be applied to the drive electrode. The application of voltage to the drive electrode may induce current on a corresponding sense electrode. For example, in some embodiments, applying voltage to electrode 24a may induce current on electrode 24b via capacitance.

At step 64, charge compensation voltage is applied to the sense electrode. For example, charge compensation voltage may be applied to the sense electrode by generating a pulse from driver circuitry that is connected to a capacitor connected to the sense electrode (as shown in FIG. 3). The charge compensation voltage may oppose the current that would otherwise be induced as a result of step 62 such that the total transfer of charge on the sense electrode following disconnection from the measurement system is approximately zero during baseline operation. In such embodiments, most or all of the measured signal during delta operation is attributable to the effects of the external object. Reducing or eliminating the baseline signal in this manner may provide improved touch sensing by allowing the gain of the measurement system to be increased without railing the system.

At step 66, the voltage on the sense electrode may be allowed to settle before reconnecting the sense electrode to the measurement system. For example, as shown in FIG. 4, some embodiments wait until time 58 before connecting the sense electrode to the measurement system to allow sense electrode voltage 50 to settle. The amount of time may be determined dynamically (e.g., by detecting when the sense electrode voltage has substantially stopped changing), may be predetermined, or may be determined using any other suitable technique.

At step 68, the sense electrode is connected to the measurement system. In some embodiments, this is accomplished by closing a switch (e.g., switch 36) that was previously opened. Reconnecting the sense electrode to the measurement system may allow one or more components of measurement circuitry 42 to begin taking capacitive measurements of the sense electrode.

At step 70, the capacitance value associated with the sense electrode is determined. As explained above, the capacitance value may be a capacitance or it may be a measurement that is proportional to, related to, or otherwise indicative of the capacitance (or change in capacitance) experienced by the sense electrode. For example, the capacitance value may be a voltage, current, time, any other suitable measurement, or any combination thereof that is measured under conditions that make the measured value indicative of the capacitance (or change in capacitance) experienced by the sense electrode. Certain embodiments may utilize one or more integrators, amplifiers, capacitors, switches, analog-to-digital converters, or any other suitable component to perform or enhance such measurements. In some embodiments, the capacitance value may be measured at a particular point in time, while other embodiments may measure a change in the capacitance value over time. The measured capacitance value may be used in conjunction with other measured values to determine the presence, proximity, or location of an external objection. For example, in some embodiments, one or more sense electrodes may be sensed following the application of voltage to a single drive electrode, and each drive electrode of touch sensor 10 may be pulsed in this manner. Controller 12 may then analyze an array of capacitance values to determine the location of one or more touches or hovers. As explained above, performing charge compensation on the sense electrode may reduce the baseline signal, thereby allowing the gain of the measurement system to be increased. Furthermore, disconnecting the sense electrode during the charging sequence and allowing the voltage to settle before reconnecting the sense electrode to the measurement system may also allow the gain of the system to be increased, since the measurement system is not subjected to the varying signal as the charge settles. By allowing the delta signal to be measured over a reduced or eliminated baseline signal, and by enabling increased gain in the measurement system, the charge compensation techniques described herein may therefore improve the accuracy, resolution, or linearity of touch or proximity sensing.

Various embodiments may perform some, all, or none of the steps described above. For example, some embodiments may omit step 60, 66, or 68. For example, rather than disconnecting and reconnecting measurement system, some embodiments may apply charge compensation voltage while the sense electrode is connected to the measurement system. In such embodiments, the application of the charge compensation voltage may be timed to reduce or eliminate fluctuations in the current on the sense electrode, though this is not required. Furthermore, certain embodiments may perform these steps in different orders or in parallel, and certain embodiments may also perform additional steps. For example, some embodiments may pre-charge the sense electrode to a reference level before disconnecting the measurement system. As another example, the above steps may be repeated for different sense electrodes or for different drive electrodes. As yet another example, some embodiments may utilize self-capacitance measurements in which the same electrode is driven and then sensed. Any suitable component of touch sensor 10 or controller 12 may perform one or more steps of the sensing sequence.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. For example, while the embodiment of FIG. 2 illustrates a particular configuration of electrodes 24, any suitable configuration may be used. As another example, while FIG. 3 illustrates example components of touch sensor 10 and controller 12, other embodiments may use any suitable components having any suitable configuration. As yet another example, while this disclosure describes certain touch-sensing operations that may be performed using the components of touch sensor 10 and controller 12, any suitable touch-sensing operations may be performed. For example, charge compensation (as described, for example, with respect to FIG. 5) may be used during proximity-sensing modes while different sensing techniques are utilized for detecting the position of a touch, or charge compensation may be used in both proximity and touch modes.

Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus comprising:
   a touch sensor comprising first and second electrodes separated by an insulator;
   a controller comprising:
   measurement circuitry;
   a processor; and
   a memory comprising logic operable, when executed by the processor, to:
   disconnect the second electrode from the measurement circuitry;
   induce a first charge on the second electrode by applying voltage to the first electrode;
   apply a second charge to the second electrode independent of the first electrode;
   connect the second electrode to the measurement circuitry after applying the second charge to the second electrode; and
   using the measurement circuitry, determine a capacitance value associated with the second electrode.

2. The apparatus of claim 1, wherein:
the controller further comprises:
voltage driver circuitry; and
a capacitor connected between the voltage driver circuitry and the second electrode; and
the logic is operable to apply the second charge to the second electrode by applying voltage to the capacitor via the voltage driver circuitry.

3. The apparatus of claim 1, wherein the logic is operable to connect the second electrode to the measurement circuitry after current on the second electrode has changed directions two or more times following the disconnection of the second electrode from the measurement circuitry.

4. The apparatus of claim 1, wherein the logic is operable to connect the second electrode to the measurement circuitry after a predetermined amount of time following the disconnection of the second electrode from the measurement circuitry.

5. The apparatus of claim 1, wherein:
the controller further comprises a switch connected between the second electrode and the measurement circuitry;
disconnecting the second electrode from the measurement circuitry comprises opening the switch; and
connecting the second electrode to the measurement circuitry comprises closing the switch.

6. The apparatus of claim 1, wherein the memory further comprises logic operable, when executed by the processor, to pre-charge the second electrode before the disconnection of the second electrode from the measurement circuitry.

7. The apparatus of claim 1 wherein the second charge is applied to the second electrode by a capacitor.

8. The apparatus of claim 1, wherein the second charge is equal in magnitude and opposite of the first charge.

9. The apparatus of claim 1, wherein, during baseline operation of the touch sensor, voltage on the second electrode is substantially similar to a reference voltage when the second electrode is connected to the measurement circuitry.

10. A method comprising:
disconnecting a sense electrode of a touch sensor from measurement circuitry of a controller;
inducing a first charge on the sense electrode by applying voltage to a drive electrode of the touch sensor;
applying a second charge to the sense electrode independent of the drive electrode;
connecting the sense electrode to the measurement circuitry after applying the second charge to the sense electrode; and
determining a capacitance value associated with the sense electrode.

11. The method of claim 10, wherein:
the controller comprises:
voltage driver circuitry; and
a capacitor connected between the voltage driver and the sense electrode; and
applying the second charge to the sense electrode comprises applying voltage to the capacitor via the voltage driver circuitry.

12. The method of claim 10, the sense electrode is connected to the measurement circuitry after current on the sense electrode has changed directions two or more times following the disconnection of the sense electrode from the measurement circuitry.

13. The method of claim 10, the sense electrode is connected to the measurement circuitry after a predetermined amount of time following the disconnection of the sense electrode from the measurement circuitry.

14. The method of claim 10, wherein:
disconnecting the sense electrode from the measurement circuitry comprises opening a switch connected between the sense electrode and the measurement circuitry; and
connecting the sense electrode to the measurement circuitry comprises closing the switch.

15. The method of claim 10, further comprising pre-charging the sense electrode before the disconnection of the sense electrode from the measurement circuitry.

16. The method of claim 10, wherein the second charge is applied to the sense electrode by a capacitor.

17. The method of claim 10, wherein the second charge is equal in magnitude and opposite of the first charge.

18. The method of claim 10, wherein, during baseline operation of the touch sensor, voltage on the sense electrode is substantially similar to a reference voltage when the sense electrode is connected to the measurement circuitry.

19. A device comprising:
a touch sensor comprising a plurality of electrodes, the plurality of electrodes comprising first and second electrodes separated by an insulator;
a display; and
a controller comprising:
measurement circuitry;
a processor; and
a storage unit comprising logic operable, when executed by the processor, to:
disconnect the second electrode from the measurement circuitry;
induce a first charge on the second electrode by applying voltage to the first electrode;
apply a second charge to the second electrode independent of the first electrode;
connect the second electrode to the measurement circuitry after applying the second charge to the second electrode; and
using the measurement circuitry, determine a capacitance value associated with the second electrode.

20. The device of claim 19, wherein:
the controller further comprises:
voltage driver circuitry; and
a capacitor connected between the voltage driver circuitry and the second electrode; and
the logic is operable to apply the second charge to the second electrode by applying voltage to the capacitor via the voltage driver circuitry.

21. The device of claim 19, wherein the logic is operable to connect the second electrode to the measurement circuitry after current on the second electrode has changed directions two or more times following the disconnection of the second electrode from the measurement circuitry.

22. The device of claim 19, wherein the logic is operable to connect the second electrode to the measurement circuitry after a predetermined amount of time following the disconnection of the second electrode from the measurement circuitry.

23. The device of claim 19, wherein the memory further comprises logic operable, when executed by the processor, to pre-charge the second electrode before the disconnection of the second electrode from the measurement circuitry.

24. The device of claim 19, wherein the second charge is applied to the second electrode by a capacitor.

25. The device of claim 19, wherein the second charge is equal in magnitude and opposite of the first charge.

26. The device of claim 19, wherein, during baseline operation of the touch sensor, voltage on the second electrode is substantially similar to a reference voltage when the second electrode is connected the measurement circuitry.

* * * * *